United States Patent
Idicula et al.

(10) Patent No.: US 9,165,086 B2
(45) Date of Patent: Oct. 20, 2015

(54) HYBRID BINARY XML STORAGE MODEL FOR EFFICIENT XML PROCESSING

(75) Inventors: Sam Idicula, Santa Clara, CA (US); Balasubramanyam Sthanikam, Foster City, CA (US); Nipun Agarwal, Saratoga, CA (US)

(73) Assignee: Oracle International Corporation, Redwood Shores, CA (US)

(*) Notice: Subject to any disclaimer, the term of this patent is extended or adjusted under 35 U.S.C. 154(b) by 201 days.

(21) Appl. No.: 12/961,394

(22) Filed: Dec. 6, 2010

(65) Prior Publication Data

US 2012/0143919 A1    Jun. 7, 2012

(51) Int. Cl.
*G06F 17/30* (2006.01)
*G06F 17/22* (2006.01)

(52) U.S. Cl.
CPC ...... *G06F 17/30938* (2013.01); *G06F 17/2247* (2013.01); *G06F 17/2252* (2013.01); *G06F 17/2258* (2013.01); *G06F 17/30911* (2013.01)

(58) Field of Classification Search
CPC .......... G06F 17/2247; G06F 17/30911; G06F 17/30923
USPC .......... 707/796, 797, 806, 807, 810
See application file for complete search history.

(56) References Cited

U.S. PATENT DOCUMENTS

| | | | |
|---|---|---|---|
| 5,870,559 A * | 2/1999 | Leshem et al. ............... | 709/224 |
| 6,421,656 B1 | 7/2002 | Cheng et al. | |
| 6,535,970 B1 | 3/2003 | Bills et al. | |
| 6,549,922 B1 * | 4/2003 | Srivastava et al. ............... | 1/1 |
| 6,601,083 B1 | 7/2003 | Reznak | |
| 6,621,083 B2 | 9/2003 | Cole | |
| 6,728,823 B1 | 4/2004 | Walker et al. | |
| 7,162,485 B2 | 1/2007 | Gottlob et al. | |
| 7,281,206 B2 | 10/2007 | Schnelle et al. | |
| 7,359,910 B2 * | 4/2008 | Wu et al. ............... | 1/1 |
| 7,366,735 B2 | 4/2008 | Chandrasekar et al. | |
| 7,499,915 B2 | 3/2009 | Chandrasekar et al. | |
| 7,680,764 B2 | 3/2010 | Chandrasekar et al. | |
| 7,734,631 B2 | 6/2010 | Richardson et al. | |
| 7,849,069 B2 | 12/2010 | Liu et al. | |
| 7,870,124 B2 | 1/2011 | Liu et al. | |

(Continued)

FOREIGN PATENT DOCUMENTS

WO    WO 2008/118537 A1    10/2008

OTHER PUBLICATIONS

Ning Zhang; Nipun Agarwal; Sivasankaran Chandrasekar; Sam Idicula; Vijay Medi; Sabina Petride; Balasubramanyam Sthanikam, Binary XML Storage Query Processing in Racle 11g, Aug. 24-28, 2009, Lyon, France; 1-12.*

U.S. Appl. No. 12/690,820, filed Jan. 20, 2010, Office Action, Jan. 17, 2012.

Berglund et al., "XML Path Language (Xpath) 2.0", W3C Recommendation, Jan. 2007, 115 pages.

(Continued)

*Primary Examiner* — James Trujillo
*Assistant Examiner* — Fatima Mina
(74) *Attorney, Agent, or Firm* — Hickman Palermo Becker Bingham LLP

(57) ABSTRACT

A method for storing XML documents a hybrid navigation/streaming format is provided to allow efficient storage and processing of queries on the XML data that provides the benefits of both navigation and streaming and ameliorates the disadvantages of each. Each XML document to be stored is independently analyzed to determine a combination of navigable and streamable storage format that optimizes the processing of the data for anticipated access patterns.

38 Claims, 6 Drawing Sheets

(56) References Cited

U.S. PATENT DOCUMENTS

| | | | |
|---|---|---|---|
| 7,885,980 B2 | 2/2011 | Tarachandani et al. | |
| 7,917,515 B1 | 3/2011 | Lemoine | |
| 8,024,329 B1 | 9/2011 | Rennison | |
| 8,090,731 B2 | 1/2012 | Sthanikam et al. | |
| 8,244,984 B1 | 8/2012 | Glasco et al. | |
| 8,255,394 B2 | 8/2012 | Branigan et al. | |
| 8,321,478 B2* | 11/2012 | Fong | 707/809 |
| 8,370,452 B2 | 2/2013 | Harvell et al. | |
| 8,555,274 B1 | 10/2013 | Chawla et al. | |
| 2002/0065822 A1 | 5/2002 | Itani | |
| 2002/0147748 A1 | 10/2002 | Huang et al. | |
| 2003/0014397 A1 | 1/2003 | Chau et al. | |
| 2003/0035000 A1 | 2/2003 | Licon et al. | |
| 2003/0088558 A1 | 5/2003 | Zharioudakis et al. | |
| 2003/0120671 A1 | 6/2003 | Kim et al. | |
| 2003/0158854 A1 | 8/2003 | Yoshida et al. | |
| 2004/0117736 A1 | 6/2004 | Newman | |
| 2004/0210573 A1 | 10/2004 | Abe et al. | |
| 2004/0236860 A1 | 11/2004 | Logston et al. | |
| 2005/0131875 A1* | 6/2005 | Riccardi et al. | 707/3 |
| 2005/0183041 A1 | 8/2005 | Chiu et al. | |
| 2005/0203957 A1 | 9/2005 | Wang et al. | |
| 2005/0228828 A1* | 10/2005 | Chandrasekar et al. | 707/104.1 |
| 2005/0240649 A1 | 10/2005 | Elkington et al. | |
| 2005/0273828 A1 | 12/2005 | Barton | |
| 2005/0289175 A1* | 12/2005 | Krishnaprasad et al. | 707/102 |
| 2006/0106890 A1 | 5/2006 | Paul et al. | |
| 2006/0112135 A1 | 5/2006 | Warshawsky | |
| 2006/0167928 A1 | 7/2006 | Chakraborty et al. | |
| 2006/0242574 A1 | 10/2006 | Richardson et al. | |
| 2007/0016604 A1 | 1/2007 | Murthy et al. | |
| 2007/0016605 A1 | 1/2007 | Murthy et al. | |
| 2007/0100793 A1 | 5/2007 | Brown et al. | |
| 2007/0198479 A1 | 8/2007 | Cai et al. | |
| 2007/0234199 A1 | 10/2007 | Astigeyevich | |
| 2007/0240035 A1 | 10/2007 | Sthanikam et al. | |
| 2007/0271243 A1 | 11/2007 | Fan et al. | |
| 2007/0299811 A1 | 12/2007 | Chandrasekar et al. | |
| 2008/0091623 A1 | 4/2008 | Idicula et al. | |
| 2008/0114725 A1 | 5/2008 | Indeck et al. | |
| 2008/0147614 A1 | 6/2008 | Tam et al. | |
| 2008/0154893 A1 | 6/2008 | Ting et al. | |
| 2008/0215878 A1* | 9/2008 | Gemmo | 713/155 |
| 2008/0222176 A1 | 9/2008 | Cai et al. | |
| 2008/0263008 A1 | 10/2008 | Beyer et al. | |
| 2008/0301129 A1 | 12/2008 | Milward et al. | |
| 2009/0024578 A1 | 1/2009 | Wang et al. | |
| 2009/0089263 A1 | 4/2009 | McHugh et al. | |
| 2009/0125480 A1 | 5/2009 | Zhang et al. | |
| 2009/0150412 A1 | 6/2009 | Idicula et al. | |
| 2009/0157722 A1* | 6/2009 | Liu et al. | 707/102 |
| 2009/0239480 A1 | 9/2009 | Rofougaran et al. | |
| 2009/0265339 A1 | 10/2009 | Chen et al. | |
| 2010/0145929 A1 | 6/2010 | Burger et al. | |
| 2010/0312771 A1 | 12/2010 | Richardson et al. | |
| 2011/0106811 A1 | 5/2011 | Novoselsky et al. | |
| 2011/0179085 A1 | 7/2011 | Hammerschmidt et al. | |
| 2011/0208730 A1 | 8/2011 | Jiang et al. | |
| 2012/0221732 A1 | 8/2012 | Waldspurger | |
| 2014/0215311 A1 | 7/2014 | Idicula et al. | |

OTHER PUBLICATIONS

Melton, Jim, et al., "XML Syntax for XQuery 1.0 (XQueryX)", W3C Recommendation, Jan. 23, 2007, 43 pages.

Snelson, John et al. "XQuery Scripting Extension 1.0", W3C Working Draft, Apr. 8, 2010, 34 pages.

Clark, James et al., "XML Path Language (XPath) Version 1.0", W3C Recommendation, Nov. 16, 1999, 37 pages.

U.S. Appl. No. 12/690,820, filed Jan. 20, 2010, Notice of Allowance, Apr. 11, 2012.

U.S. Appl. No. 12/389,306, filed Feb. 19, 2009, Office Action, Apr. 27, 2012.

U.S. Appl. No. 12/690,820, filed Jan. 20, 2010, Notice of Allowance, Jul. 9, 2012.

U.S. Appl. No. 10/918,054, filed Aug. 12, 2004, Notice of Allowance, Sep. 20, 2012.

U.S. Appl. No. 12/389,306, filed Feb. 19, 2009, Final Office Action, Feb. 15, 2013.

U.S. Appl. No. 12/389,306, filed Feb. 19, 2009, Advisory Action, Jun. 5, 2013.

U.S. Appl. No. 12/389,306, filed Feb. 19, 2013, Office Action, Jun. 25, 2013.

European Patent Office, "Office Action" in application No. PCT/US2011/063310, dated Aug. 12, 2013, 16 pages.

Current Claims in application No. PCT/US2011/063310, dated Aug. 2013, 4 pages.

Bremer et al., "Integrating Document and Data Retrieval Based on XML", dated Aug. 12, 2005, 31 pages.

Pal et al., "Indexing XML Data Stored in a Relational Database", Proceedings of the 30th VLDB Conference, Toronto, Canada, dated 2004, 12 pages.

U.S. Appl. No. 12/389,306, filed Feb. 19, 2009, Final Office Action, Sep. 30, 2013.

U.S. Appl. No. 12/792,659, filed Jun. 2, 2010, Office Action, Feb. 6, 2012.

U.S. Appl. No. 12/871,869, filed Aug. 30, 2010, Office Action, May 9, 2012.

U.S. Appl. No. 12/792,659, filed Jun. 2, 2010, Office Action, May 16, 2012.

U.S. Appl. No. 12/792,659, filed Jun. 2, 2010, Office Action, Sep. 10, 2012.

U.S. Appl. No. 12/871,869, filed Aug. 3, 2012, Notice of Allowance, Oct. 11, 2012.

U.S. Appl. No. 12/491,981, filed Jun. 25, 2009, Final Office Action, Nov. 21, 2012.

U.S. Appl. No. 12/792,659, filed Jun. 2, 2010, Notice of Allowance, Feb. 5, 2013.

U.S. Appl. No. 12/631,985, filed Dec. 7, 2009, Office Action, May 13, 2013.

U.S. Appl. No. 12/491,981, filed Jun. 25, 2009, Office Action, Aug. 26, 2013.

U.S. Appl. No. 12/491,981, filed Jun. 25, 2009, Office Action, Apr. 11, 2012.

U.S. Appl. No. 12/389,306, filed Feb. 19, 2009, Office Action, Jan. 13, 2015.

* cited by examiner

HYBRID BINARY XML STORAGE MODEL FOR EFFICIENT XML PROCESSING

CROSS-REFERENCE TO RELATED APPLICATIONS

This application is related to application Ser. No. 12/690,820, filed Jan. 20, 2010 entitled "Using Node Identifiers In Materialized XML Views And Indexes To Gain Directly Navigate To And Within XML Fragments", the entire contents of which is hereby incorporated by reference as if fully set forth herein, under 35 U.S.C. §119(e).

FIELD OF THE INVENTION

The present invention relates to storing XML documents for efficient retrieval and navigation.

BACKGROUND

XML

Extensible Markup Language (XML) is a World Wide Web Consortium (W3C) standard for representing data. Many applications are designed to output data in the form of XML documents. Various techniques may be used to store data from such XML documents into a relational database.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant element. Collectively, an element along with its attributes and descendants, are referred to as a tree or a sub-tree. Nodes with a parent/child relationship are referred to as having an immediate hierarchical relationship as there may be a direct navigation path between them.

XML data may be stored in relational databases using object relational storage or binary XML BLOB storage or CLOB storage because such databases are very efficient at manipulating data. However, while it may be efficient to search object relational storage or binary XML storage down the XML hierarchy from parent to child, these storage structures are not well suited for performing hierarchical navigation that requires traversing ancestor links up the hierarchy or sibling traversal.

STORAGE AND QUERYING SYSTEMS FOR XML

Various types of storage mechanisms are used to store an XML document. XML documents may be stored in a relational database by shredding the document into individual elements and storing the elements in individual columns of a table. In a database server, an XML document may be stored in a row of a table, and nodes of the XML document may be stored in separate columns in the row.

Alternatively, an entire XML document may be stored as a large object (LOB) in a column of a database table. The large object column may store a character large object (CLOB) stored as text or instead may be stored as a binary large object (BLOB). The binary object may comprise a tokenized stream of XML data. Such a tokenized stream for an XML document may alternatively be stored in volatile memory.

XML QUERY AND XPATH

It is important for database systems that store XML data to be able to execute queries using XML query languages. XML Query Language (XQuery) and XML Path Language (XPath) are important standards for a query language, which can be used in conjunction with SQL to express a large variety of useful queries. XPath is described in *XML Path Language (XPath)*, version 1.0 (W3C Recommendation 16 Nov. 1999), herein incorporated by reference and available at the time of writing at http://www.w3.org/TR/xpath, as well as in *XML Path Language (XPath)* 2.0 (W3C Recommendation 23 Jan. 2007), herein incorporated by reference and available at the time of writing at http://www.w3.org/TR/xpath. XQuery is described in *XQuery 1.0: An XML Query Language* (W3C Recommendation 23 Jan. 2007), herein incorporated by reference and available at the time of writing at http://www.w3.org/TR/xquery. Also, there is an XQuery scripting language: http://www.w3.org/TR/xquery-sx-10/.

PATH EXPRESSIONS

The structure of an XML document establishes parent-child relationships between the nodes within the XML document. The "path" for a node in an XML document reflects the series of parent-child links, starting from a "root" node, to arrive at the particular node. For example, in the example document shown in Table 1, the path to the "UnitPrice" node is /PurchaseOrder/LineItems/LineItem/Part/UnitPrice, since the "UnitPrice" node is a child of the "Part" node, and the "Part" node is a child of a "LineItem" node, and the "LineItem" node is a child of the "LineItems" node, and the "LineItems" node is a child of the "Purchase Order" node.

A path expression is evaluated relative to a particular node called the "context" which is the starting point for the navigation. Navigation is specified using the path axes (".", "/", "//", and ".."). Each of these axes selects one or more nodes which are then further filtered based on what name test or node test follows the axis.

TABLE 1

Example Purchase Order document

```
<PurchaseOrder>
    <ShippingInstructions>
        <name>Michael L. Allen</name>
        <address>300 Oracle Parkway Redwood Shores CA 94065
        USA</address>
        <telephone>650 506 7300</telephone>
    </ShippingInstructions>
    <Reference>ALLEN-201102109392822PDT</Reference>
    <LineItems>
        <LineItem
            ItemNumber="1">
            <Description>Robocop</Description>
            <Part
                Id="715515009324"
                UnitPrice="39.95"
                Quantity="4" />
        </LineItem>
        <LineItem
            ItemNumber="2">
            <Description>Life of Brian</Description>
            <Part
```

TABLE 1-continued

Example Purchase Order document

```
            Id="715515010320"
            UnitPrice="39.95"
            Quantity="2" />
        </LineItem>
    </LineItems>
</PurchaseOrder>
```

A subset of XPath axis and name/node tests includes:

| / | Child axis |
| // | Descendent axis |
| . | Current axis |
| .. | Parent axis |
| * | Wildcard name test |

The syntax used herein is standard XPath syntax. However, it should be appreciated that any syntax having equivalent semantics as the above axes may be used.

Descending in the tree from parent to child is called forward navigation. Ascending up the hierarchy from child to parent is referred to as backward navigation. Another example of backward navigation is to access a previous sibling. Paths that start with slash ("/") are evaluated starting at the root node of the hierarchy.

NAVIGATING XML DATA

The XPath/XQuery languages support the operations that can be performed on a tree. However, storing XML data as described above and indexing the data may not provide for efficient navigation of tree-traversal. To overcome this problem, an in-memory document object model (DOM) may be created, and the navigation operations may be performed on the DOM. One problem with this approach is that the entire DOM tree must be constructed in memory before the tree traversal can be performed, even if only a few nodes out of the entire tree are needed to evaluate an expression. For a large document, this presents a scalability issue both in terms of time to build the tree and the amount of memory required to process an XPath expression. Building an in-memory DOM may require ten times as much space as the size of the XML document that the DOM represents. Thus, a 100 MB document may require a gigabyte of memory to hold the DOM tree.

To avoid the above-mentioned problems with constructing a DOM in volatile memory, another approach may be used to store the navigation links of the hierarchy persistently together with the XML content. In other words, the XML data may be stored as a tree on disk, with each node of the hierarchy storing both content and navigation links. Each node of the hierarchy may contain links providing random access to other nodes in the hierarchy. However, such an approach may require that the navigation links that support accessing ancestors, siblings, and children be stored interleaved with the content of each node.

Storing the XML in a tree-oriented manner, where each node in the XML document is stored along with pointers to its parent, first child and siblings, or a combination of one or more of these pointers is efficient for processing larger documents since we can navigate directly along various XPath axes by following the stored pointers, and typically read and process a much smaller part of the document. It is also faster for creating a DOM in memory since the relevant pointers are already stored on disk. However, this type of storage requires more memory for processing as well as more disk space for storage (hence causing a higher I/O overhead, especially for smaller documents). It also requires more memory and processing overhead during storage.

Supporting navigation requires that additional information be stored in association with each node in the document that allows direct access to a node's parent, first child, first sibling, and previous sibling. These pointers to other nodes allow efficient processing of XPath expressions that use ancestor axes. However, because the pointers associated with a node allow direct access to adjacent nodes, that is, nodes with a direct hierarchical relationship with the node, there is no need to store the nodes in any particular order. Traversal of the nodes is performed using the pointers, and the storage order of the nodes does not matter.

STREAMING XML DATA

A persistent stream representation of an XML document is a binary representation of the XML document in which a serialized sequence of token values are stored in the same order as the tokens are parsed from the document. A token value is a compact representation of a character sequence token that is parsed from a textual representation of the document. The order in which tokens are parsed from the textual document is referred to herein as "document order." Thus, an XML document can be streamed by reading a stored stream representation of the document.

Creating a binary stream representation of an XML document is efficient because only a small part of the document needs to be kept in memory at any given time. Also, a binary stream is a compact storage form that conserves disk space. No navigation pointers are stored along with the document data. An XML storage model based on a stream of SAX-like events is efficient for evaluating simple XPaths and XQueries over small documents, as well as for operations that require reading large portions of the document in sequential (document) order and when no ancestor navigation is needed.

Schema processing is an example of the need to process an entire XML document in document order. Applications of schema processing include testing conformance of an XML document to its schema and registering a schema with a database system. For schema processing, the order that the elements appear in the schema and in the XML document matters. The order of the elements in the document must match the order in which they are specified in the schema. A streamable binary representation is useful for such an application because it preserves the order of the nodes in the document.

As documents become larger, reading the entire document into memory and scanning the events in the stream may constitute a significant overhead in terms of both I/O and CPU time. When the XML data is stored as binary XML, such as a SAX stream token sequence, in order to navigate forward, the tokens have to be read sequentially until the desired node is found. There is no random access within the document for navigating directly to a child node without reading and skipping all the previous descendants.

Evaluating an XPath expression requiring ancestor navigation on an XML document stored as a binary stream may be especially expensive. Finding a parent or ancestor node requires processing from the beginning of the sequence because parents and ancestors appear before the current node in the sequence. Finding a sibling node depends on whether the sibling appears before or after the current node in sequence. Although ancestors and siblings may be identified by following forward links in this way, multiple passes through the document may be required. The streaming XPath evaluation engine may traverse the entire document each time a query is evaluated. The process of traversing the entire document is highly inefficient if the input XML document is a large document, consisting of large sub-trees that do not match an XPath expression in the query.

A more efficient storage mechanism is required that can minimize the I/O overhead and memory usage, as well as scale to larger-sized documents and more complex queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
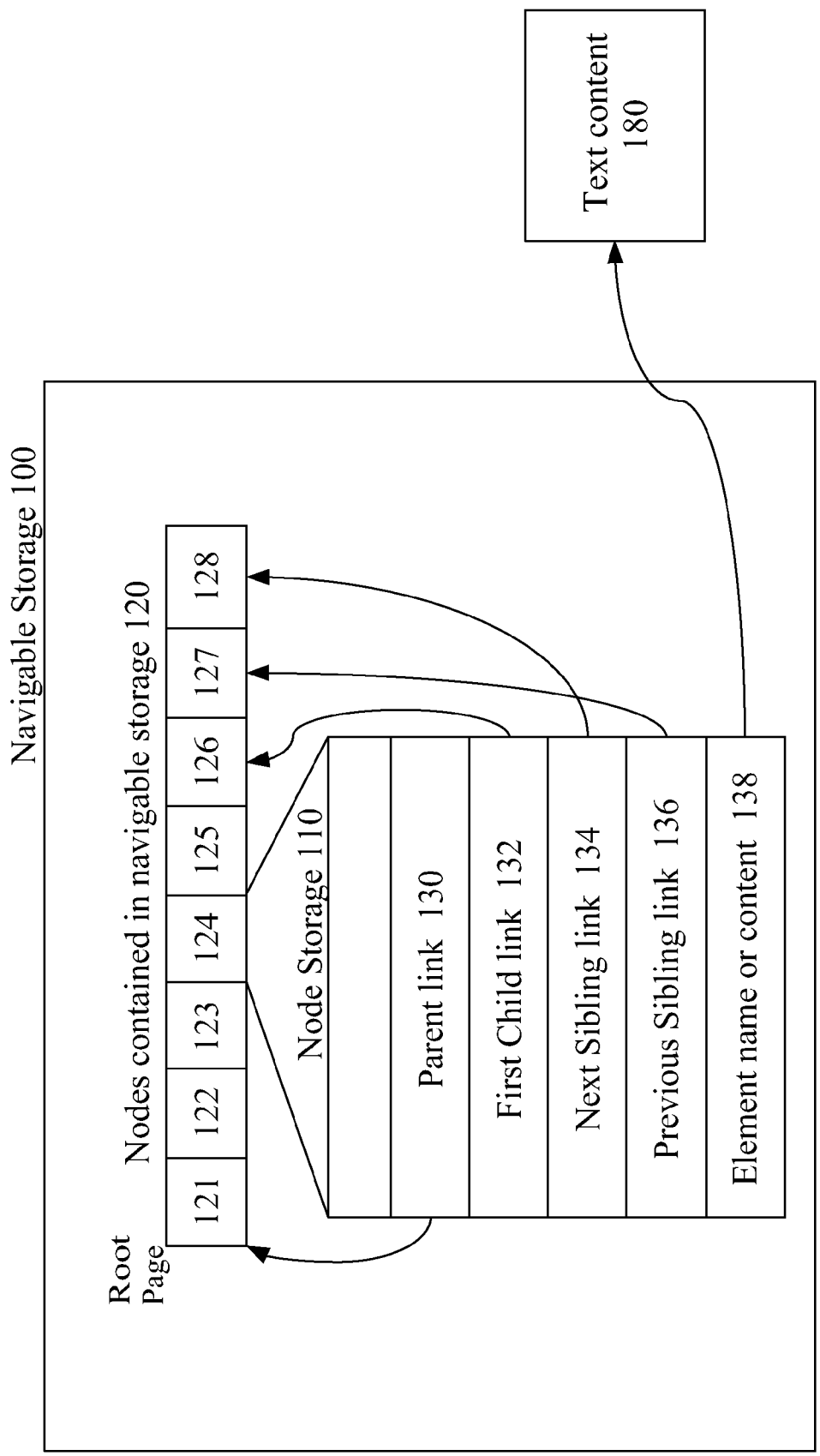
FIG. 1 is a diagram that shows contents of a node of navigable storage, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

General purpose storage systems are required to store and retrieve XML data for a variety of uses including evaluating XPath expressions that require navigation as well as processing an entire document or fragment in document order. A hybrid storage approach is presented that provides the advantages of both navigable and streamable storage and minimizes the disadvantages of each.

A content management system may manage a collection of large XML documents. Each higher level node (that is, nodes closest to the root node) may be accessed more frequently than any individual leaf node. However, in a streamable representation of a document, the higher level nodes may be far apart for documents with large amounts of content stored in the leaf nodes. Thus, a streaming approach would require reading much content to find the frequently accessed nodes of the document. A tree-model that provides direct navigation from parent to child and sibling nodes would increase the efficiency of finding these nodes. However, in order to create a tree-model, all of the content in all leaf nodes would have to be loaded into memory.

The approach described herein stores some, but not all, nodes of an XML document in navigable storage. In addition, some and potentially all nodes are stored in a separate streamable storage. In this context, separate means that the space for the streamable storage segment need not be allocated from the same memory segment that is being used for navigable storage, and there is no requirement that the streamable storage segment be contiguous with the navigable segment Nodes stored the navigable storage format are represented differently than nodes stored in the streamable storage format. Frequently-accessed nodes between which there is much intervening content in the document are likely to be placed in navigable storage whereas less frequently accessed nodes and/or nodes for which the fragment of the entire sub-tree is accessed are likely to be stored as a streamable representation. Pointers from nodes in the tree representation may point to nodes that are stored only as a streamable representation. Textual data that is stored as part of the stream is pointed to from within the tree model to avoid duplicating storage of text. For content that is not stored as a stream, a separate text area is created for that purpose.

The approach further includes a way to determine for each individual node in a document which storage representation should be used to represent the node. In addition, once nodes of a document are stored in a combination of navigable and streamable storage, the approach includes how to use the storage representation to evaluate queries on a set of XML documents stored according to the approach described herein.

Representing Navigable Nodes

FIG. 1 is a diagram depicting nodes of Navigable Storage 100. One of the nodes 124 among the multiple nodes of navigable storage 120 is shown in expanded view 110. Some of the contents of a node of navigable storage is illustrated. Each navigation link may be a pointer. For example, the Parent Link 130 within Node 124 points to Node 121, indicating that Node 121 is the parent node of Node 124. Likewise, Node 124's First Child Link 132 points to Node 126 indicating that Node 126 stores Node 124's first child node. Next Sibling Link 134 and Previous Sibling Link 136 are links to Node 124's next and previous sibling links respectively. In an embodiment, the text content is stored outside of the navigable storage in either a streamable node or in a separate text segment. The Element Name or Content 138 points to Text Content 180.

Representing an XML Document in Hybrid Navigation/Streaming Format

Figure 2:
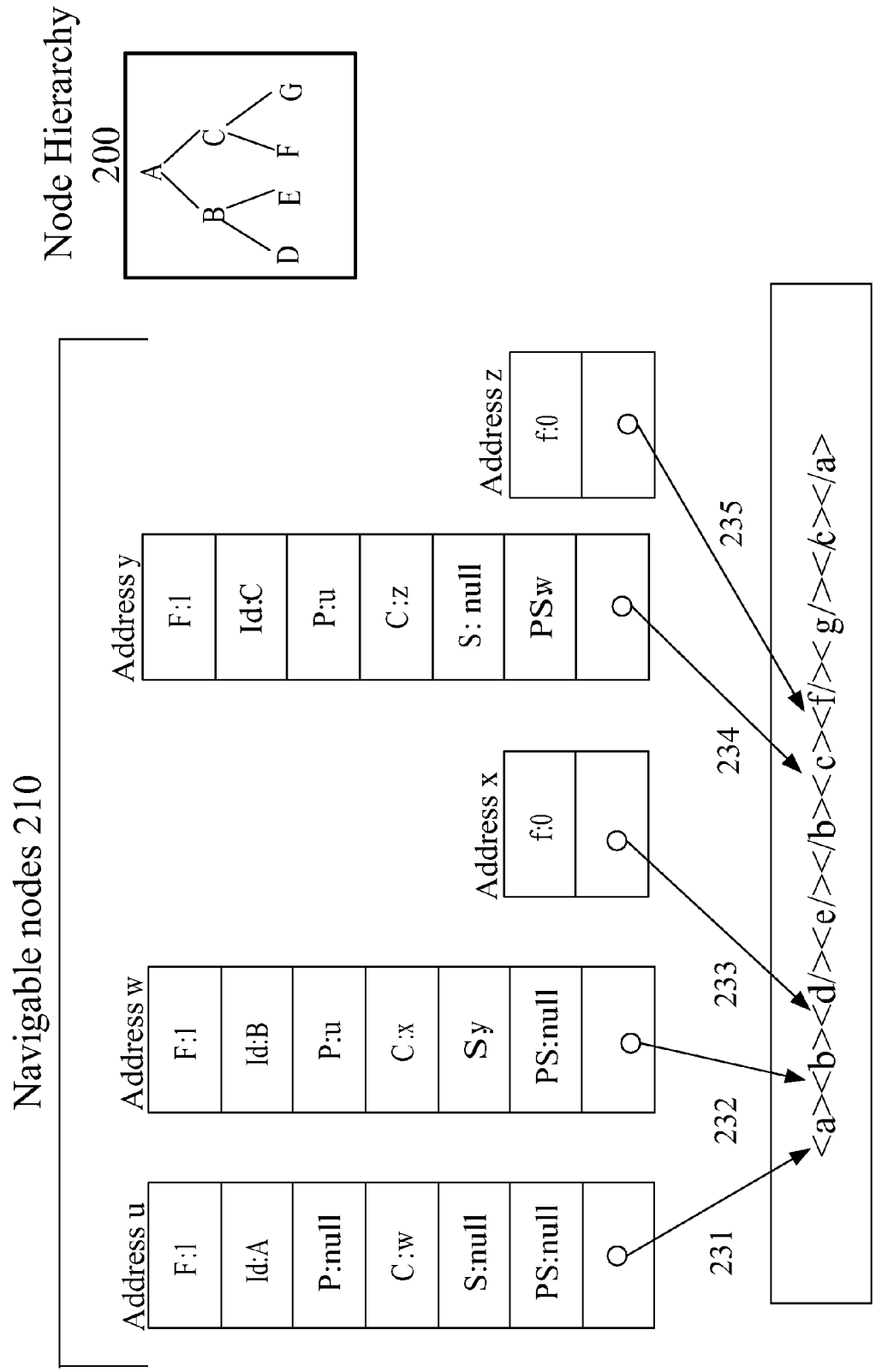
FIG. 2 is a diagram that shows storing an example XML document in hybrid navigable/streamable format, according to an embodiment of the invention.

FIG. 2 is a diagram that shows an example XML document stored in hybrid navigable/streamable format. Node Hierarchy 200 is an illustration of a node hierarchy representing the document in this example. Streamable Nodes 220 shows the nodes of the example document in streamable format for purposes of illustration (the actual binary representation may not appear this way). The streamable nodes are shown as a serialized representation of the hierarchy shown in Node Hierarchy 200, with the nodes in document order.

The Navigable Nodes 210 include only certain nodes, A, B, and C that are stored in fully navigable format. The remaining nodes D, E, and F are only stored in streamable format. In addition, dummy nodes are created in the navigable storage segment for certain nodes that are not fully navigable. The nodes occupy contiguous space within the navigable storage segment, and the address of each node may be relative to the beginning of the navigable node segment. The fully navigable nodes may all be of the same size, and the dummy nodes may all be of the same size, but dummy nodes occupy less space than a fully navigable node. For example, the nodes at Address x and Address z are not fully navigable nodes (they are dummy nodes) because only minimal information is stored about those nodes (no navigation pointers are stored).

For purposes of exposition, FIG. 2 shows conceptually that each navigable node stores several pieces of information (though the information is not necessarily represented as shown in the diagram. For example, labels "F", "P", "C" etc. may not literally be stored in the node as shown). "F" represents a flag that indicates whether the current node is a full node complete with navigation pointers or a dummy node that only points at a node in the streamable storage. Whenever the first child of a fully navigable node is not fully navigable, a dummy node representing the first child is provided. Subsequent children need not be represented by a dummy node. "Id" indicates an identifier for the element represented by the node. An identifier may be a name such as shown in the example or it may be a token identifier that takes less space than the name and is stored in association with the name outside of the node such as in a symbol table. Alternatively, the Id may be a pointer into a text segment that contains the name of the element.

The remaining entries in a navigable node are pointers. A pointer is used for finding data that is stored in a location indicated by the pointer. A pointer may be an offset address, such as a byte or word offset from the beginning of the Navigable Nodes 210. A pointer may be an absolute byte address or any other indication of a location within storage. "P" represents the parent pointer. The root node, A, of the document has no parent, and its parent pointer is null. nodes B and C are children of node A, and so their parent pointers contain Address u because node A is located at Address u. "C" represents the first child pointer. B is the first child of A, so node A's child pointer contains Address w because node B is stored at Address w. The first children of nodes B and C are not fully stored in navigable storage, so dummy nodes are allocated for them (nodes D and F). The first child of node B is node D, and its first child pointer points to the dummy node at Address x. Likewise, the first child of node C is node F, and its first child pointer points to the dummy node at Address z. "S" is the next sibling pointer. Node B is the only navigable node in this example that has a sibling that is also stored in a fully navigable node. Node B's next sibling pointer points to Address y because its sibling, node C, is stored at Address y. "PS" represents the previous sibling. Node C's previous sibling pointer references Address w where its previous sibling, Node B, is stored.

Textual content for a navigable node is not stored within the navigable node. If the same node is also stored in streamable storage, then the navigable node may contain a pointer to the beginning of the textual content for the node in the streamable storage or text segment. This eliminates duplicate storage of the textual content. Content pointers 231-235 illustrate each navigable node pointing into the streamable storage. In an embodiment, if a node has no textual content, the content pointer may point to the beginning of the streamable node as shown in this simple example. When textual content is present in the node, the content pointer may point directly to the text, and not to the beginning of the node.

Figure 5:
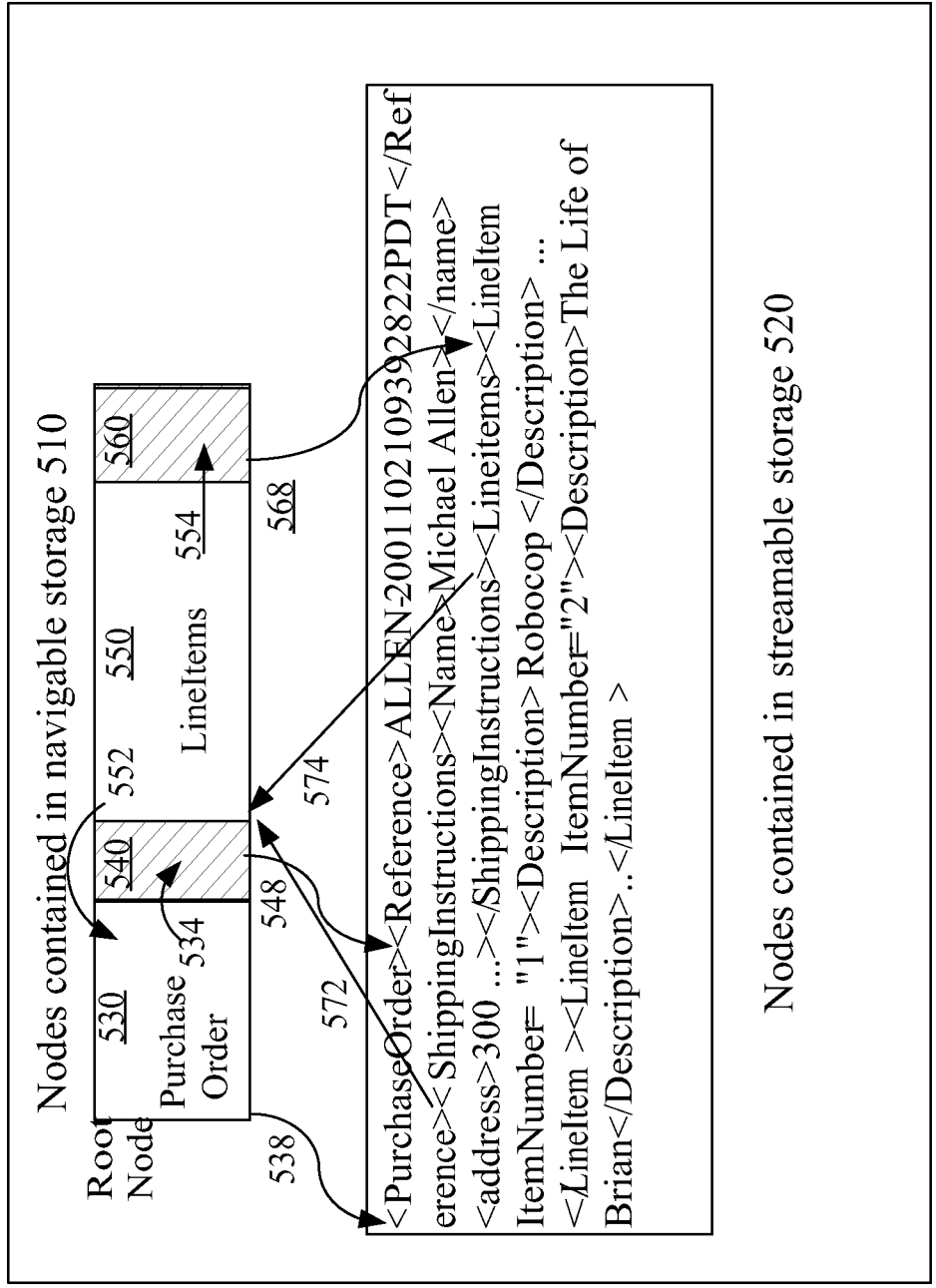
FIG. 5 shows the example XML document from Table 1 represented as a hybrid storage format, according to an embodiment of the invention.

In addition to containing a binary representation of document nodes in document order, the streamable representation may contain for each streamable node a pointer into the navigable storage to identify the next node in document order that is stored as a fully navigable node. For example, although not shown in FIG. 2, the streamable representation of node B would contain a pointer to Address y (containing Node C) in navigable storage which is the next fully navigable node in document order after Node B. If there are no more navigable nodes in the document, the pointer may be null, or the pointer may not be specified. (FIG. 5 shows pointers from streamable storage back into navigable storage).

In the embodiment illustrated in FIG. 2, the entire document is stored in streamed format with only certain nodes also stored in navigable format. In an alternative embodiment, instead of storing the entire document in a streamable representation, only certain nodes may be stored in streamable storage. In an embodiment, only nodes that are not stored in a navigable representation are stored in a streamable representation. In an alternative embodiment, a node may be stored in both formats (such as Nodes A, B, and C in the example). A node that has at least one child stored in navigable format should itself also be stored in navigable format. Thus, the top nodes of the document hierarchy are more likely to be stored in navigable format than the leaf nodes of the hierarchy.

Determining which nodes within an XML document to store in navigable format and in streamable format may be a function of the common query access patterns, the content of the document to store, and the relative processing and I/O speeds of the hardware platform on which the storage system runs. Thus, the decision of which document nodes are to be stored in navigable and streamable format is made on a per document basis and on a per system basis. One document may not be stored in the same way as another document, even when both documents conform to a common structure. Similarly, a document stored on one storage system may not be represented in the same way as the same document stored on another storage system having different processing and I/O speed characteristics.

Determining Nodes to Store in Navigable Storage

For each node of the example document shown in Table 1, a determination is made as to whether to store the node in a format that supports navigation (navigable representation), streamable representation, or both. The characteristics of each node of the document are evaluated to make the determination of whether to store the node in navigable storage. In an embodiment, the size of the sub-tree rooted at each node of the tree is evaluated. The size of the sub-tree may be measured both in terms of node count and content size (e.g. space occupied on disk including size of content). The node count is an indication of the amount of processing needed to process the sub-tree and the content size is an indication of the I/O cost to read the sub-tree from the disk.

Table 2 shows a node count and a sub-tree size respectively for each sub-tree rooted at a node. The sub-tree size is determined by counting the number of characters representing the sub-tree in the textual representation of the XML document. The number of characters of content will vary from one purchase order to the next. Thus, a determination of where to store a node based on content size means that a different storage determination may be made for different node instances identified by the same XPath within different purchase orders.

The determination of where to store each node is also based on the processing speed and I/O speeds of the host platform.

Processing speed is an indication of how fast a sub-tree can be processed. The I/O speed is an indication of how quickly data can be read from persistent storage. Thus, a suitability metric may be computed based on the node count of the sub-tree and the processing power of the system on which the document will be stored as well as on the content size and the I/O speed of the system. When the value of the suitability metric exceeds a threshold, the system decides to store the node in navigable storage.

An example suitability metric may be computed as:

suitability metric=node count*processing speed+content size*I/O speed where the processing speed and I/O speed is specific to the computer system on which the conversion from textual to binary representation is performed. In an embodiment, processing speed is measured in thousands of million instructions per second (kMIPS). In the example, the processing speed for processing the document is 10 kMIPS. In an embodiment, I/O speed is measured in megabytes per second MB/s. In the example, the speed of the I/O system is 300 MB/s. Thus, the suitability metric computed for the example PurchaseOrder node in Table 2 having a node count of 21 and a sub-tree size of 535 would be computed as:

21*10+535*300=160,710

TABLE 2

Purchase Order annotated with sub-tree sizes

```
<PurchaseOrder> [21 ,535]
    <Reference>ALLEN-201102109392822PDT>[1, 37]
    <ShippingInstructions> [4 ,177]
        <name>Michael L. Allen</name> [1, 29]
        <address>300 Oracle Parkway Redwood Shores CA 94065
        USA</address>[1, 65]
        <telephone>650 506 7300</telephone>[1, 35]
    </ShippingInstructions>
    <LineItems> [15 ,293]
        <LineItem [7 , 127]
            ItemNumber="1"> [1, 13 ]
            <Description>Robocop</Description> [1, 34]
            <Part [4, 91]
                Id="715515009324" [1, 18]
                UnitPrice="39.95" [1, 18]
                Quantity="4" /> [1, 13]
        </LineItem>
        <LineItem [7, 132]
            ItemNumber="2"> [1 , 143]
            <Description>Life of Brian</Description> [1, 40]
            <Part [4, 91]
                Id="715515010320" [1,18]
                UnitPrice="39.95" [1, 18]
                Quantity="2" /> [1, 13]
        </LineItem>
    </LineItems>
</PurchaseOrder>
```

The example document was selected to be small for purposes of exposition. In a real system, the documents to store could be quite large, and the sub-tree size may be measured in thousands of bytes (kB) or even millions of bytes (MB). However, the threshold against which the suitability metric is compared to determine whether the node should be stored in navigable storage can be scaled appropriately. For this example, the threshold is manually selected to be 85,000. Table 3 shows the suitability metrics for each of the nodes in the example document and the determination of which nodes are stored in navigable storage based on whether the suitability metric exceeds the user threshold

TABLE 3

Determining Storage Representation for each node

| Node | Suitability Metric Value | Navigable Storage? |
|---|---|---|
| /PurchaseOrder | 160710 | YES |
| /PurchaseOrder/Reference | 11110 | NO |
| /PurchaseOrder/ShippingInstructions | 53140 | NO |
| /PurchaseOrder/ShippingInstructions/name | 8710 | NO |
| /PurchaseOrder/ShippingInstructions/address | 19510 | NO |
| /PurchaseOrder/ShippingInstructions/telephone | 10510 | NO |
| /PurchaseOrder/LineItems | 88050 | YES |
| /PurchaseOrder/LineItems/LineItem | 38170 | NO |
| /PurchaseOrder/LineItems/LineItem/ItemNumber | 3910 | NO |
| /PurchaseOrder/LineItems/LineItem/Description | 10210 | NO |
| /PurchaseOrder/LineItems/LineItem/Part | 27340 | NO |
| /PurchaseOrder/LineItems/LineItem/Part/Id | 5110 | NO |
| /PurchaseOrder/LineItems/LineItem/Part/Unit Price | 5110 | NO |
| /PurchaseOrder/LineItems/LineItem/Part/Quantity | 3910 | NO |
| /PurchaseOrder/LineItems/LineItem | 39670 | NO |
| /PurchaseOrder/LineItems/LineItem/ItemNumber | 42910 | NO |
| /PurchaseOrder/LineItems/LineItem/Description | 12010 | NO |
| /PurchaseOrder/LineItems/LineItem/Part | 27340 | NO |
| /PurchaseOrder/LineItems/LineItem/Part/Id | 5410 | NO |

Applying this process to all nodes of the document shown in Table 2 would result in selecting nodes at paths /PurchaseOrder and /PurchaseOrder/LineItems, and only those nodes, to be stored in navigable storage. Thus, the amount of storage for maintaining navigation pointers is minimized for those nodes for which navigation provides minimal benefit.

Determining Threshold Values for the Suitability Metric

Determining whether to store a node in fully navigable storage relies on establishing a threshold against which to compare automatically computed metrics that are computed based on expected access patterns, document node attributes, and system platform attributes. The selection of a correct threshold may be left as an exercise to a system administrator based on the administrator's experience. In other words he can experiment and tune by altering the threshold parameters and monitoring query performance.

However, tools can be constructed to facilitate an intelligent selection of a useful threshold. For example, an automated tool can analyze historical query logs to extract a set of XPath operations and evaluate the cost tradeoffs when the set of operations is performed on a particular corpus of documents. Such a tool can automatically assess for each document node the frequency of navigation operations to and from the node as well as the frequency of reading the sub-tree rooted at the node. With this information, the processing and I/O requirements may be determined for each node. Once the requirements are determined, they may be compared to the system capabilities in order to determine an optimal tradeoff.

Determining Nodes to Store in Streamable Storage

As mentioned above, in one embodiment, all document nodes are stored in streamable storage. In another embodiment, only nodes that are not stored in navigable storage are stored as streamable storage. In yet another embodiment, each node is evaluated for inclusion in streamable storage independent of each other node and independent of whether the node is stored in navigable storage, except that each node is required to be stored in at least navigable or streamable storage.

Evaluating whether to include a node in streamable storage may be performed in a manner similar to that described for determining whether to store the node in navigable storage. For example, a historic workload mix may be analyzed, and if the percentage of full document retrievals is below a certain threshold, then no nodes may be stored in a streamable representation. This same criteria can be applied at the sub-tree level to determine if individual nodes of the document should be stored in streamable storage. The analysis at the sub-tree level may consider the frequency of retrieving the full sub-tree. When the criteria for storing a node in streamable storage is not met, the text from the node may be placed in a separate text segment, and pointers are stored with the node on the stack that point to the text segment instead of to the streamable storage.

Constructing Navigable and Streamable Storage

Figure 3:
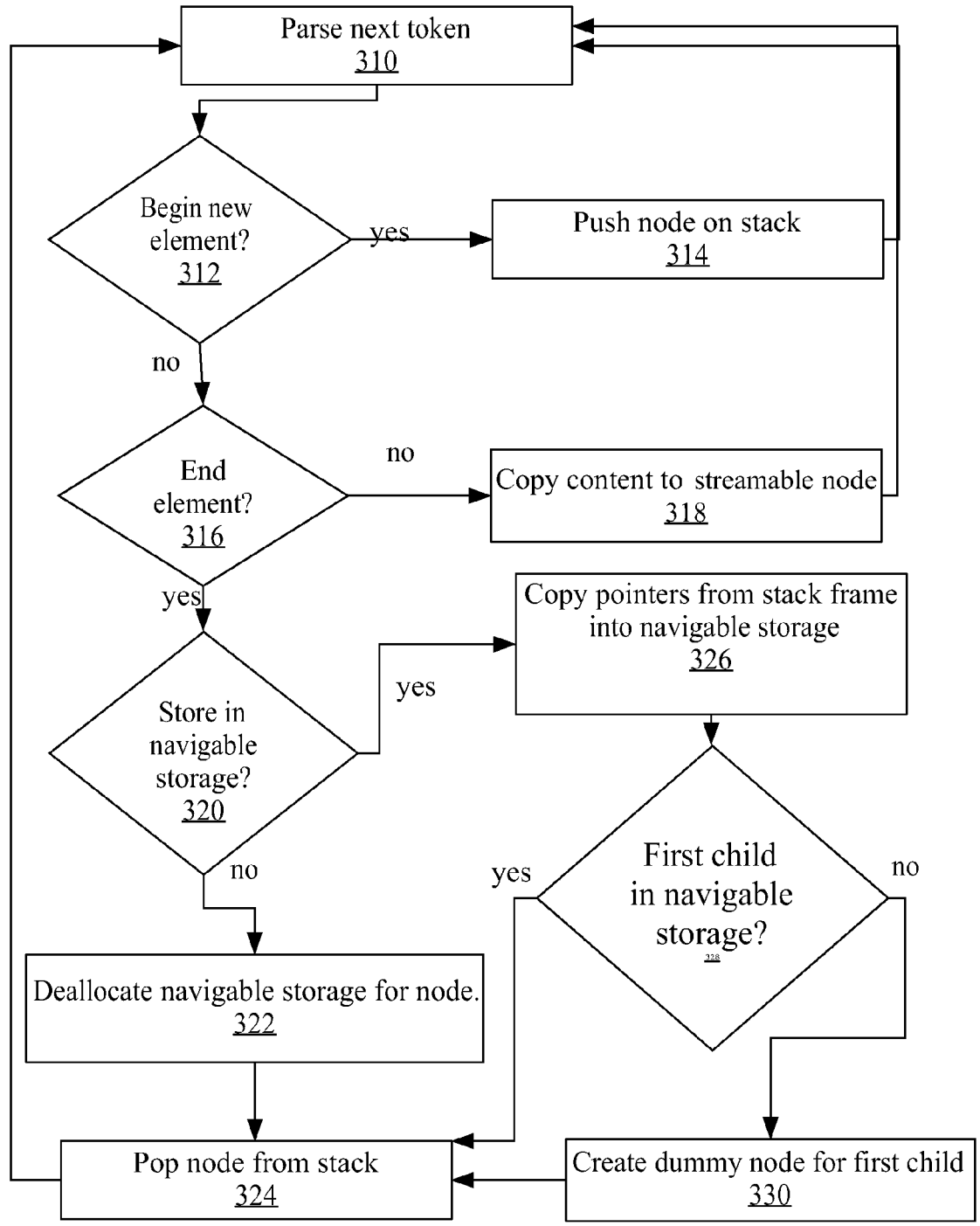
FIG. 3 is a flow diagram of the steps for creating hybrid navigable/streamable storage, according to an embodiment of the invention.

When a storage system receives an XML document for storing, the text representation of the document is parsed, and the navigable and streamable storage representations are created in parallel. FIG. 3 is a flow diagram of the process of creating navigable and streamable storage nodes. In Step 310, the next token is parsed from the document. When a parsed token is identified in Step 312 as the beginning of an XML element, a stack frame representing the element in pushed onto the stack in Step 314. Space is allocated in the navigable storage segment for a fully navigable node corresponding to that element. Information about the node is stored in the stack frame including a pointer to the newly allocated space in navigable storage along with values associated with the node such as number of nodes in the sub-tree (initialized to 1), size of the sub-tree (initialized to the size of the node), and a flag to indicate whether any of the node's children are placed in navigable storage (initialized to false). As additional tokens are parsed, these values may be updated. At the time the node information is placed on the stack, none of the node's children have been processed yet.

The next token is parsed. If the next token is a child element of the previous node, the process takes place as described above. Space is allocated in navigable storage, and a node corresponding to the element is pushed onto the stack with values initialized in the new stack frame for the new node. Values in the stack entry include not only a pointer to the newly allocated navigable storage, but also the pointer into the navigable storage that was allocated for the parent is copied into the child's parent pointer within the child node's stack frame. In general, the navigation pointers to nodes in the navigable storage are tracked and stored in the stack as the nodes are being created, as will be appreciated by one skilled in the art. In addition, the previous element's node count stored in the stack is incremented and the size of the child node is added to the size of the previous node's (which is the current node's parent's) sub-tree.

In Step 316, if the next token is not an end element, then in Step 318 the token is copied into a streamable node and the next token is parsed (Step 310). When the next token indicates the end of an element, in Step 316 a determination is made in Step 320 regarding whether to store that element in the navigable storage node that was previously allocated. The determination is made based on the suitability metric described above and whether any of the node's children were placed in navigable storage. The suitability metric uses the current values of node count and sub-tree size stored in the element's stack frame.

If a determination is made to not store the node in navigable storage (i.e., the suitability metric does not exceed the pre-established threshold) then the space previously allocated for the node is released. By de-allocating space that will not be used to store a node in navigable storage, the amount of memory needed to construct the navigable storage is constrained. The entire document need not be represented in memory at once. Even if the node is a first child of a parent node, at this point in processing, it is not yet known whether the node's parent node will be placed in navigable storage, and thus, do not know whether a dummy node in the navigable storage needs to be created for the node. Data is stored in the parent's stack frame to indicate that the first child node is not stored in navigable storage and includes a pointer to the first child's streamable node. If the parent is later stored as fully navigable, then a dummy navigable node will be created to point to the first child's node in streamable storage.

If the node is to be stored in a fully navigable storage node in Step 320, appropriate values are copied from the stack into the navigable storage to represent the node in Step 326. The node's parent node, which is still on the stack, is updated to indicate that one of its children nodes is placed in navigable storage. In step 328, if information stored within the node indicates that the node's first child is not stored in fully navigable storage, then in Step 330, a dummy node is created for the node's first child node. In Step 324, the stack frame for the node is popped off the stack.

The flow described above assumes that all nodes are stored in streamable storage. In an alternate embodiment, the document as a whole may be evaluated to determine whether to store the document in streamable storage. If a determination is made not to store the document in streamable storage, then all nodes are stored as fully navigable with content pointers pointing into a separate text segment. In this embodiment, Step 318 may copy content to a separate text segment. The text segment need not be allocated from the same memory segment that is being used for navigable storage, and there is no requirement that the text segment be contiguous with the navigable segment. In another embodiment, each node may be independently evaluated for inclusion in streamable storage. A node that is stored in fully navigable storage may also be stored in streamable storage or the navigable node may point to a text segment for its content. A node that is not stored in streamable storage must be stored as fully navigable.

For the nodes that are added to the streamable storage, a pointer to the beginning of the streamable node is stored in the node's content pointer in the stack. If the node is not to be included in streamable storage, then the stack content pointer is set to the location within the text segment for the node's content.

In addition, streamable nodes may contain pointers back into the navigable storage segment to locate the next fully navigable node that is next in document order. The back pointer in a streamable node for which a dummy node exists may point to the end of the dummy navigable node. This will be the location of the next fully navigable node. Otherwise, back pointers in all other streamable nodes will point into navigable storage as follows: If the last space allocated in navigable storage is only temporarily allocated, the back pointer for the streamable node may end up pointing to either the beginning or the end of that storage. The back pointer will point to the beginning of the storage if the node for which the navigable storage was temporarily allocated is later de-allocated. The back pointer will point to the end of the temporarily allocated storage if the node for which the navigable storage was temporarily allocated is later permanently assigned to use that storage. If however, the last storage allocated in navigable memory has been permanently assigned to a node, then the back pointer for the current streamable node will point to the end of this permanently allocated navigable space. In one embodiment, such back pointers may not be inserted until the correct location is determined. In an alternate embodiment, pointers stored within streamable nodes to the next fully navigable node may initially point to the navigable node immediately following (adjacent to) the last allocated navigable node. If the space for the parent is later de-allocated, the pointer may be reassigned to the beginning of the de-allocated space. Additionally, the pointers may be removed or assigned to null if no node occupies space allocated to the next fully navigable node.

Figure 4:
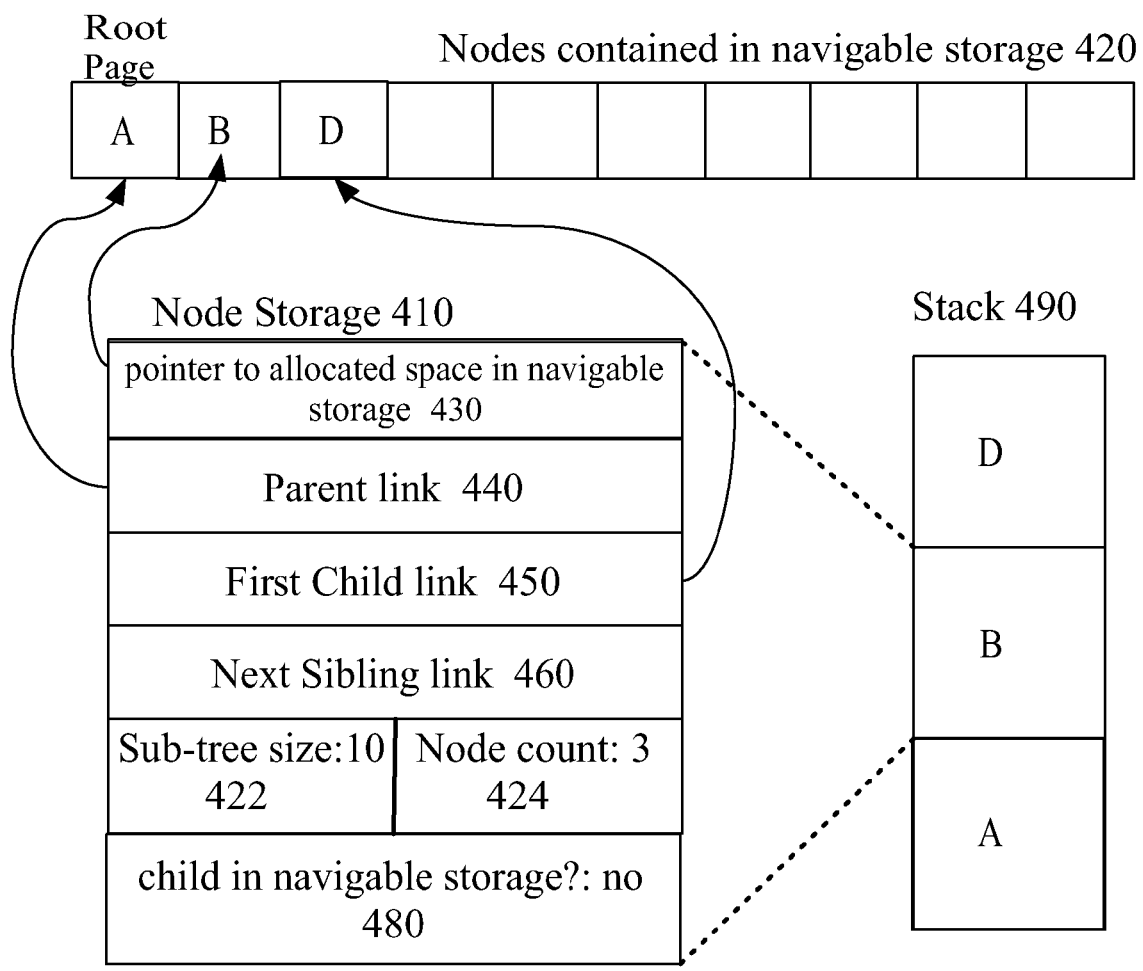
FIG. 4 shows a snapshot of a state during the construction of navigable storage for the example XML document introduced in FIG. 2, according to an embodiment of the invention.

FIG. 4 shows a snapshot of a state during the construction of navigable storage for the example XML document introduced in FIG. 2. The sequence of events leading up to the state illustrated in FIG. 4 is described below. Some steps are described in more detail than others, but the same set of steps is used for each similar node:

- A pushed onto Stack 490 and space allocated in Navigable Storage 420.
- B pushed onto Stack 490, and a node is allocated for B in Navigable Storage 420. A pointer 430 to the B's navigable storage is stored in the stack frame. B's parent link (pointer) is initialized, A's child link is updated. The size of B's node is added to A's sub-tree size and A's node count is incremented. A flag 480 is initialized to indicate that none of B's children are stored in navigational storage.
- D is pushed onto Stack 490, B's child pointer 450 is updated, and the Node D's size is added to the sub-tree size for B (472) and A, and the node counts for B (474) and A are incremented.

At the end of these steps, the state of the construction is shown in FIG. 4. Subsequent steps include:

- Determining that D's suitability metric does not exceed the threshold: popping D off the stack and de-allocating navigable storage for D.
- Processing node E the same as D.
- Determining that B's suitability metric exceeds the threshold. Copying link values for B from the stack frame into the node allocated in Navigable Storage 420. Noticing that B's first child, D, is not stored in navigable storage, and creating a dummy navigable node for D that points to D's streamable storage node.
- Popping B off the stack
- Setting the flag in A to indicate a child of A is stored in navigable storage.

At this point, the sub-tree for B has been completely processed and the sub-tree for C is processed next. Once the sub-tree for C is processed, A is copied into the navigable storage allocated for it and popped off the stack.

Evaluating a Query Using Hybrid Navigable and Streamable Storage

Once the document is parsed and its nodes are stored in a combination of navigable and streamable storage structures, these structures may be used for evaluating queries. FIG. 5 shows the example XML document from Table 1 represented as a hybrid storage format. The following is a sequence of steps to evaluate the following query on the hybrid binary representation shown in FIG. 5:

for $t in /PurchaseOrder/LineItems
where $t/LineItem/Description="The Life of Brian"
return ($t/../Reference)

PurchaseOrder is the root node which is known to be stored in node 530. LineItems is the next node to find. Traversing first child pointer 534 locates a dummy node, indicating that the first child (Reference) is not stored in navigable storage. The hashed shading in FIG. 5 is used to signify a dummy node. The dummy node's pointer is traversed to find the streamable node storing the Reference element. The Reference node is scanned to the end, and pointer 572 points to the next navigable node 550 that represents LineItems. To evaluate the "where" clause, the next node to find is LineItem which is a child of LineItems. The first child pointer 554 points to dummy node 560, indicating that the first child of LineItems is not stored in navigable storage. Dummy node 560's pointer 568 points to the start of a LineItem node in streamable storage. The LineItem node in streamable storage is scanned to find the Description node that is a child of LineItem. When the Description node is found, its value ("Robocop") is compared to "The Life of Brian," and thus, the predicate is not satisfied by the first LineItem. There is no pointer at the end of the first LineItem indicating that there are no more fully navigable nodes. Alternatively, a pointer may exist with a null value. However, there is another LineItem in the following streamable node. Scanning the next LineItem node, the Description is found, and the content of the Description is "Life of Brian" which satisfies the predicate. $t is set to represent the node 550 (LineItems) because a LineItem was found in the set of LineItems that satisfied the predicate.

To evaluate $t/../Reference, the parent pointer 552 of the LineItems navigable node is used to find the parent of LineItems which is node 530 (PurchaseOrder). Although not stored in navigable storage, the Reference node can easily be found in streamable storage by traversing first child link 534 to access the dummy node, and content pointer 548 to find the Reference node.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
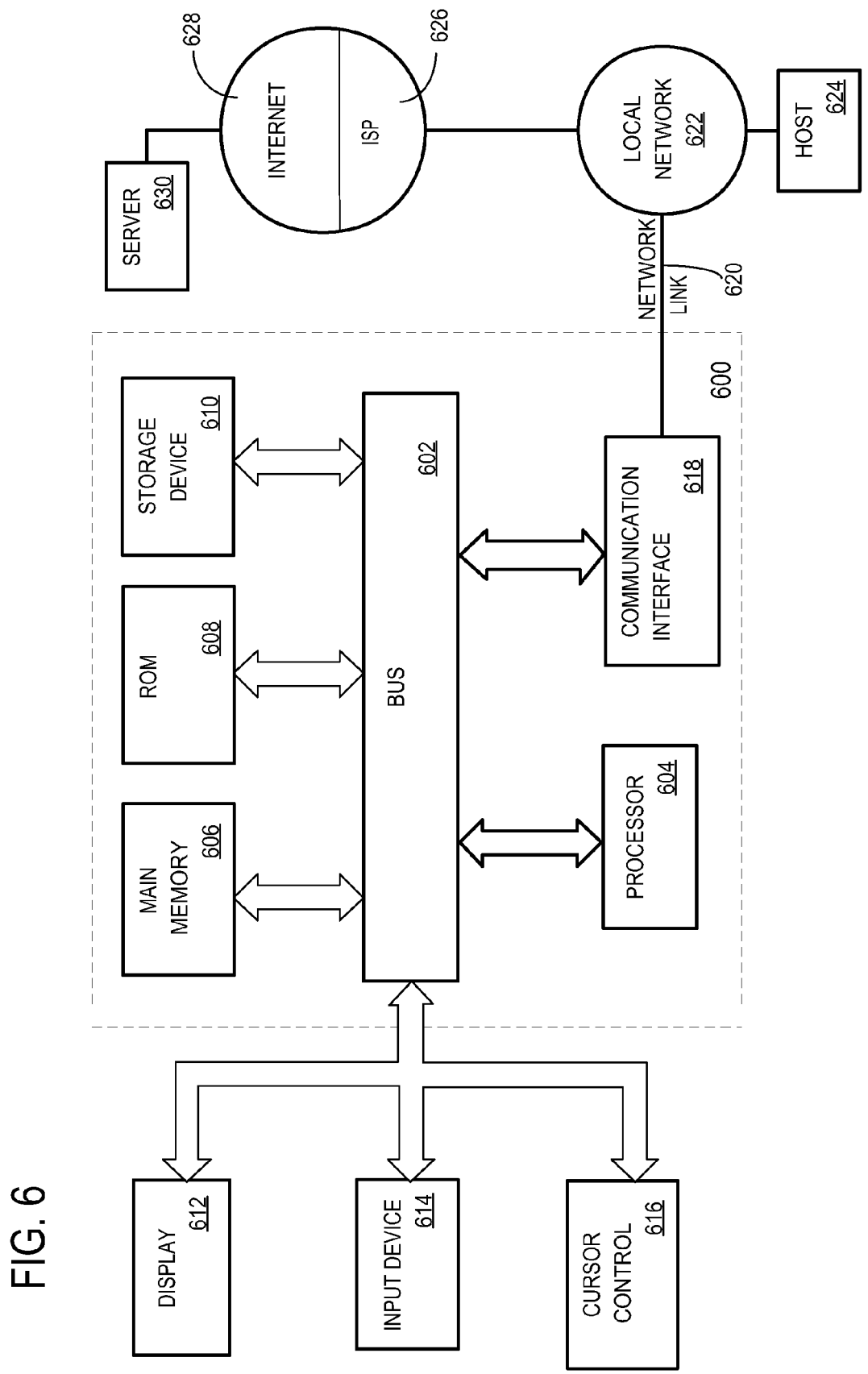
FIG. 6 is a block diagram of a computer system used to implement the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for storing an XML document of a plurality of documents, the method comprising steps of:
    storing in a persistent repository a persistent representation of the XML document that includes a navigable representation and a streamable representation that is separate from said navigable representation,
        wherein the XML document includes a tree of nodes in a hierarchical relationship, each node of the tree of nodes having an immediate hierarchical relationship with at least one other node in the tree of nodes, wherein the streamable representation contains nodes of the tree of nodes that are in document order, wherein the navigable representation contains a subset of nodes of the tree of nodes, the subset of nodes including less than all nodes of the tree of nodes, and wherein each particular node of the subset of nodes in the navigable representation includes at least one pointer to content, of said each particular node, that is contained in the streamable representation, and at least one pointer to another node of the subset of nodes in the navigable representation, said at least one pointer to the other node in the navigable representation being one of:
a pointer to a parent node of said each particular node,
a pointer to a child node of said each particular node,
a pointer to a sibling node of said each particular node, or
a pointer to a previous sibling node of said each particular node;

wherein the steps are performed by one or more computing devices.

2. The method of claim 1,
wherein the navigable representation contains, for one or more nodes contained in the navigable representation, a pointer to a parent node that is contained within the navigable representation.

3. The method of claim 1,
wherein the navigable representation contains, for one or more nodes, a pointer to a sibling node that is contained within the navigable representation.

4. The method of claim 1,
wherein the navigable representation contains, for one or more nodes, a pointer to a child node that is contained within the navigable representation.

5. The method of claim 1, wherein the streamable representation contains all nodes in the XML document.

6. The method of claim 1, wherein there is at least one node in the XML document that is not contained in the streamable representation.

7. The method of claim 1,
wherein the navigable representation, for each node of one or more nodes contained in the navigable representation, contains a child pointer to a child node that is contained in the streamable representation and that is not stored in the navigable representation.

8. The method of claim 1,
wherein the navigable representation, for each node of one or more nodes contained in the navigable representation, contains a sibling pointer to a sibling node that is contained in the streamable representation and that is not stored in the navigable representation.

9. The method of claim 1,
wherein one or more nodes are contained in both the navigable representation and the streamable representation; and
wherein, for each node of said one or more nodes, the navigable representation contains a pointer to said each node contained in the streamable representation.

10. The method of claim 1,
wherein one or more nodes are contained in the navigable representation and not contained in the streamable representation; and wherein, for each node of said one or more nodes, the navigable representation contains a pointer to a text segment stored separate from the navigable representation.

11. The method of claim 1,
wherein the XML document is a first XML document that conforms to an XML schema and a second XML document conforms to said XML schema; and
wherein for a particular XPath expression,
at least one node that matches the particular XPath expression in the first XML document is contained within the navigable representation of the first XML document, and
at least one node in the second XML document that matches the particular XPath expression is not contained within the navigable representation of the second XML document.

12. The method of claim 1,
further comprising evaluating a path expression by
retrieving a pointer to a certain node in the streamable representation by traversing the navigable representation, and
using the pointer to the certain node in the streamable representation to access the certain node in the streamable representation.

13. The method of claim 12,
wherein evaluating a path expression further comprises,
after accessing the certain node in the streamable representation,
retrieving a pointer from the streamable representation to another node in the navigable representation, and
using said another node in the navigable representation to further traverse the navigable representation.

14. The method of claim 1,
wherein the navigable representation contains, for one or more nodes, a pointer to a node in the streamable representation; and
wherein the streamable representation contains, for one or more nodes, a pointer to a node in the navigable representation.

15. The method of claim 1, wherein there is at least one node in the XML document that is contained in the streamable representation and is not contained in the navigable representation.

16. The method of claim 1, wherein a node contained in the navigable representation does not contain any pointers to nodes in the navigable representation.

17. The method of claim 16, wherein said node contains a pointer to a node in the streamable representation.

18. The method of claim 1, wherein said each particular node satisfies a criterion inclusion in the navigable representation.

19. The method of claim 18, wherein the criterion is based on one or more of the following:
a common query access pattern for the plurality of documents,
characteristics of content of said each particular node,
characteristics of a sub-tree rooted at said each particular node, or
system resources of a storage system of the persistent repository on which the streamable representation is persistently stored.

20. One or more non-transitory storage media storing instructions which, when executed by one or more computing devices, cause a method for storing an XML document of a plurality of documents, the method comprising steps of:
storing in a persistent repository a persistent representation of the XML document that includes a navigable representation and a streamable representation that is separate from said navigable representation,
wherein the XML document includes a tree of nodes in a hierarchical relationship, each node of the tree of nodes having an immediate hierarchical relationship with at least one other node in the tree of nodes,
wherein the streamable representation contains nodes of the tree of nodes that are in document order,
wherein the navigable representation contains a subset of nodes of the tree of nodes, the subset of nodes including less than all nodes of the tree of nodes, and
wherein each particular node of the subset of nodes in the navigable representation includes at least one pointer to content, of said each particular node, that is contained in the streamable representation, and at least one pointer to another node of the subset of nodes in the navigable representation,
said at least one pointer to the other node in the navigable representation being one of:
a pointer to a parent node of said each particular node,
a pointer to a child node of said each particular node,
a pointer to a sibling node of said each particular node, or
a pointer to a previous sibling node of said each particular node;
wherein the steps are performed by one or more computing devices.

21. The one or more non-transitory storage media of claim 20,
wherein the navigable representation contains, for one or more nodes contained in the navigable representation, a pointer to a parent node that is contained within the navigable representation.

22. The one or more non-transitory storage media of claim 20,
wherein the navigable representation contains, for one or more nodes, a pointer to a sibling node that is contained within the navigable representation.

23. The one or more non-transitory storage media of claim 20,
wherein the navigable representation contains, for one or more nodes, a pointer to a child node that is contained within the navigable representation.

24. The one or more non-transitory storage media of claim 20, wherein the streamable representation contains all nodes in the XML document.

25. The one or more non-transitory storage media of claim 20, wherein there is at least one node in the XML document that is not contained in the streamable representation.

26. The one or more non-transitory storage media of claim 20,
wherein the navigable representation, for each node of one or more nodes contained in the navigable representation, contains a child pointer to a child node that is contained in the streamable representation and that is not stored in the navigable representation.

27. The one or more non-transitory storage media of claim 20,
wherein the navigable representation, for each node of one or more nodes contained in the navigable representation, contains a sibling pointer to a sibling node that is contained in the streamable representation and that is not stored in the navigable representation.

28. The one or more non-transitory storage media of claim 20,
wherein one or more nodes are contained in both the navigable representation and the streamable representation; and
wherein, for each node of said one or more nodes, the navigable representation contains a pointer to said each node contained in the streamable representation.

29. The one or more non-transitory storage media of claim 20,
wherein one or more nodes are contained in the navigable representation and not contained in the streamable representation; and
wherein, for each node of said one or more nodes, the navigable representation contains a pointer to a text segment stored separate from the navigable representation.

30. The one or more non-transitory storage media of claim 20,
wherein the XML document is a first XML document that conforms to an XML schema and a second XML document conforms to said XML schema; and
wherein for a particular XPath expression,
at least one node that matches the particular XPath expression in the first XML document is contained within the navigable representation of the first XML document, and
at least one node in the second XML document that matches the particular XPath expression is not contained within the navigable representation of the second XML document.

31. The one or more non-transitory storage media of claim 20, wherein the method further comprises:
evaluating a path expression by:
retrieving a pointer to a certain node in the streamable representation by traversing the navigable representation, and
using the pointer to the certain node in the streamable representation to access the node in the streamable representation.

32. The one or more non-transitory storage media of claim 31,
wherein evaluating a path expression further comprises, after accessing the certain node in the streamable representation,
retrieving a pointer from the streamable representation to another node in the navigable representation, and
using said another node in the navigable representation to further traverse the navigable representation.

33. The one or more non-transitory storage media of claim 20,
wherein the navigable representation contains, for one or more nodes, a pointer to a node in the streamable representation; and
wherein the streamable representation contains, for one or more nodes, a pointer to a node in the navigable representation.

34. The one or more non-transitory storage media of claim 20, wherein there is at least one node in the XML document that is contained in the streamable representation and is not contained in the navigable representation.

35. The one or more non-transitory storage media of claim 20, wherein a node contained in the navigable representation does not contain any pointers to nodes in the navigable representation.

36. The one or more non-transitory storage media of claim 35, wherein said node contains a pointer to a node in the streamable representation.

37. The one or more non-transitory storage media of claim 20, wherein said each particular node satisfies a criterion inclusion in the navigable representation.

38. The one or more non-transitory storage media of claim 37, wherein the criterion is based on one or more of the following:
- a common query access pattern for the plurality of documents,
- characteristics of content of said each particular node,
- characteristics of a sub-tree rooted at said each particular node, or
- system resources of a storage system of the persistent repository on which the streamable representation is persistently stored.

* * * * *

UNITED STATES PATENT AND TRADEMARK OFFICE
CERTIFICATE OF CORRECTION

PATENT NO.         : 9,165,086 B2
APPLICATION NO.    : 12/961394
DATED              : October 20, 2015
INVENTOR(S)        : Idicula et al.

Page 1 of 1

It is certified that error appears in the above-identified patent and that said Letters Patent is hereby corrected as shown below:

On Title page, column 2, Item (56) under other publications, line 3, delete "Racle" and insert
-- Oracle --, therefor.

In The Specification

In column 2, line 39, delete ""Purchase Order"" and insert -- "PurchaseOrder" --, therefor.

In The Claims

In column 9, line 67, delete "threshold" and insert -- threshold. --, therefor.

Signed and Sealed this
Twelfth Day of July, 2016

Michelle K. Lee
*Director of the United States Patent and Trademark Office*